Dec. 8, 1936.  V. BENDIX  2,063,024
BRAKE
Original Filed July 14, 1924
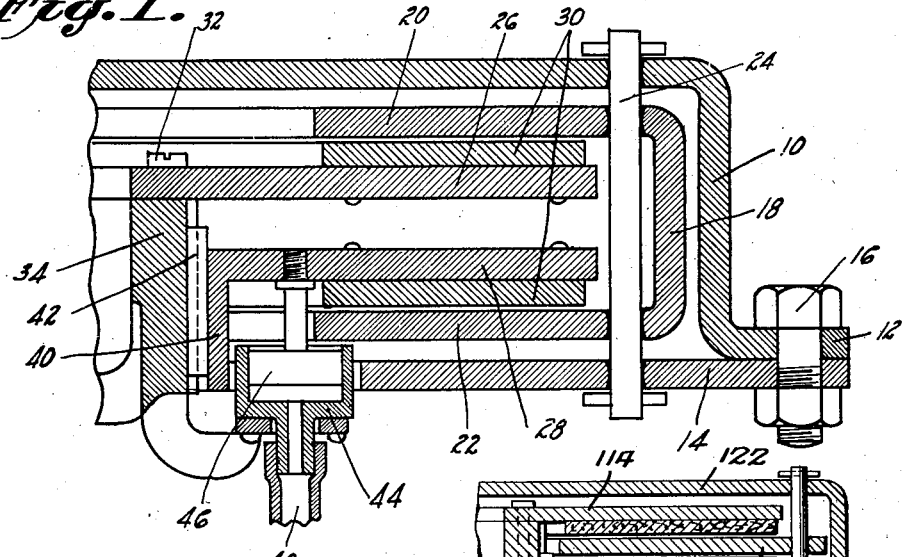
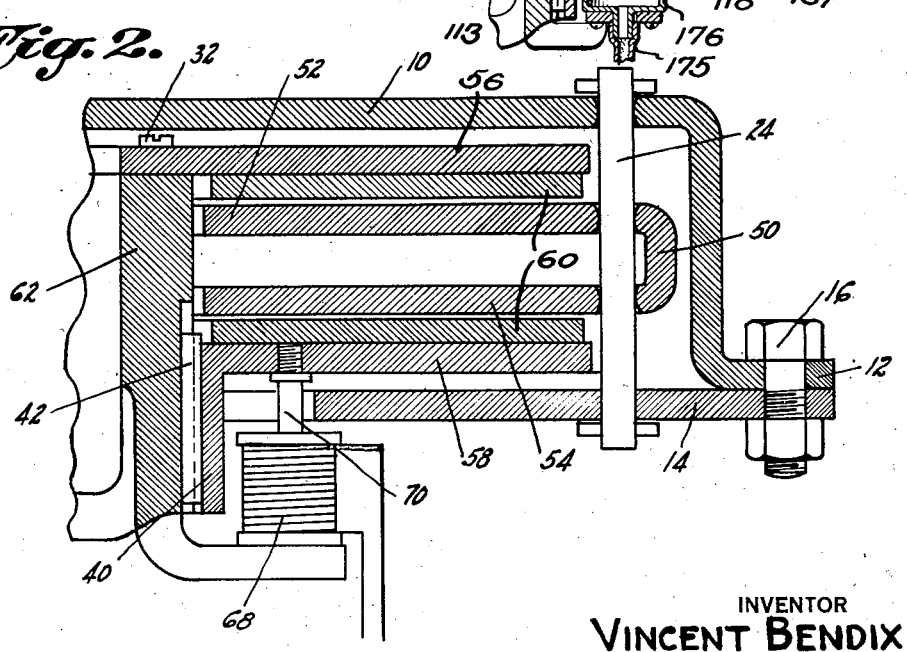
INVENTOR
VINCENT BENDIX
BY
M. W. McConkey
ATTORNEY Patented Dec. 8, 1936

2,063,024

UNITED STATES PATENT OFFICE 2,063,024

BRAKE

Vincent Bendix, South Bend, Ind., assignor, by mesne assignments, to Bendix Aviation Corporation, South Bend, Ind., a corporation of Delaware Refiled for abandoned application Serial No. 216,096, August 29, 1927, which in turn is a division of application Serial No. 726,050, July 14, 1924. This application February 23, 1933, Serial No. 658,205

21 Claims. (Cl. 188—72)

This invention relates to brakes and is illustrated as embodied in an axially-movable brake of the type ordinarily referred to as a disk brake.

One important feature of the invention relates to operating the disks of the brake, or their equivalents, by power means arranged in a novel manner and which may include a cylinder and plunger operated by air or other fluid power, or a solenoid and plunger operated electrically, or equivalent power means including two relatively movable members one of which acts on each of a pair of brake disks arranged to move in opposite directions to apply the brake.

Another feature of the invention relates to the arrangement of the disks of the brake to act on a rotatable member, shown as arranged within an outer drum or housing and which is permitted a slight axial movement to adjust itself to the pressure of the friction disks. Preferably the rotatable member includes two spaced disks or parts which may be integrally connected to form a structure generally U-shaped in cross section, thus facilitating the dissipation of the heat when the brake is applied.

The above and other objects and features of the invention, including various novel combinations of parts and desirable particular constructions, will be apparent from the following description of the illustrative embodiments shown in the accompanying drawing, in which:

Figure 1 is a horizontal radial section through one-half of a brake arranged to be operated by vacuum pressure;

Figure 2 is a similar section of an electrically operated brake, and

Figure 3 is a horizontal radial section through one-half of a brake arranged to be operated by air pressure.

The brake of Figure 1 includes a rotatable element such as a drum or housing 10 having a radially extending flange 12 to which a cover plate 14 may be secured by bolts or other fastenings, and with which is associated a rotatable disk member 18 which has spaced plates 20 and 22. I prefer to make the disk member 18 in one integral piece substantially U-shaped in cross section, so that the plates or disks 20 and 22 are integrally connected. The disk member 18 is preferably mounted to allow a slight axial movement to adjust its position automatically to the friction means of the brake, by being secured to the drum or housing 10 through the medium of keys 24 passing through openings in the drum or housing 10 and in the plates 20 and 22 of the disk member 18. Thus the disk member 18 rotates with the drum and yet is free to shift slightly in an axial direction to adjust its position automatically when the brake is applied.

The friction means or working disk member of the brake includes a pair of disks or plates 26 and 28 faced with brake lining or other friction material 30 and which are arranged to be spread apart against the inner surfaces of the disks or plates 20 and 22 to apply the brake. The disk or plate 26 is shown as secured by screws or other fastenings 32 to a hollow support sleeve 34 which may be the axle housing or the front wheel knuckle in the case of an automobile brake. The sleeve 34 and a base flange formed on the plate or disk 28 are formed with registering grooves for keys 42 only one of which is shown, which keys prevent relative angular movement of the plates or disks 26 and 28 while permitting the latter to move freely with respect to the other in an axial direction.

The working disks or plates are operated by a novel motor which in the embodiment of Figure 1 is shown as including cylinders 44 secured to said sleeve 34 by an extending arm only one of which is shown, and each cylinder of which is provided with a plunger or piston 46 secured to the disk or plate 28. The particular arrangement illustrated in Fig. 1 is intended to be operated by air pressure acting on the outer side of the piston plunger 46, the pressure being provided by suction from the intake manifold acting through a conduit 48 communicating with the interior of the cylinder 44. That is, while the device may be operated either under super-atmospheric or sub-atmospheric pressure, the particular embodiment illustrated is arranged for sub-atmospheric pressure.

A modified form adapted for operation under super-atmospheric pressure illustrated in Fig. 3, comprises a rotatable disc member 164 axially slidable upon pins 167 carried in the rotatable casing 122 and brake friction discs 114 and 118, one of which may be fixed to the support sleeve 113 and the other slidably keyed thereon. To actuate the brake discs cylinders 176, only one of which is shown, carried by the sleeve 113 are fitted with pistons 177 which, as shown, are connected to the brake disc 118. Upon application of fluid pressure through the conduit 175 to the piston and cylinder, it will appear that the piston will thrust brake disc shoe 118 into engagement with disc 164, sliding the same on the key 167 into engagement with brake disc shoe 114. Thus the braking force is equalized and transmits no axial component of force to the rotatable member.

In the arrangement of Figure 2, the rotatable disk member 50 which corresponds to the disk member 18 and which is formed with spaced plates or disks 52 and 54, is somewhat thinner than the disk member 18, and the friction means of the brake is arranged to engage with the outer surfaces instead of the inner surfaces of the disks and plates 52 and 54. The working disks or plates 56 and 58 are faced with friction material 60, and the disk 56 is secured to a support sleeve 62 which sleeve carries on extending arms, solenoids 68, each of which is provided with a plunger or core 70, secured to the disc or plate 58. As illustrated, the core 70 is preferably provided with a magnetic tip portion within the solenoid which is adapted to move the plunger toward the brake discs upon energization of the solenoid.

This application is a division of my copending application No. 726,050, filed July 14, 1924, and relates to the subject matter disclosed in application No. 216,096, filed August 29, 1927.

While two illustrative embodiments have been described in detail, it is not my intention to limit the scope of the invention to those particular embodiments or otherwise than by the terms of the appended claims.

I claim:

1. A brake comprising a rotatable element, a disk member having spaced plates, a working disk member comprising a pair of plates arranged side by side and mounted for being spread laterally so as to expand said working member and frictionally engage the plates of the other member, one of said members being secured to said element so as to be rotated therewith and the other being held against rotation, a plunger secured to one of the plates of said working member, and means for moving said plunger secured to the other plate of said working member providing a motor whereby said working member may be spread.

2. A disk brake comprising a rotatable member having generally parallel surfaces, in combination with a pair of non-rotatable plates arranged side by side and mounted for movement in opposite directions to engage said surfaces, together with a power motor including parts rigidly secured to and acting respectively on said non-rotatable plates.

3. A disk brake comprising, in combination, a rotatable element having generally parallel surfaces, a pair of plates movable in opposite directions for engagement with said surfaces, an operating plunger secured to one of said plates, and a power device acting on the other of said plates including and acting on said plunger.

4. A disk brake comprising, in combination, a rotatable axially shiftable element, a pair of plates movable into operative engagement with said element, a non-rotatable support to which one of said plates is secured, and means for keying the other of said plates to said non-rotatable support for axial movement relative to the secured plate.

5. A disk brake comprising, in combination, a rotatable axially shiftable element, a pair of plates movable into operative engagement with said element, a non-rotatable support to which one of said plates is secured, and means for keying the other of said plates to said support for axial movement relative to said secured plate, together with applying means for movement of one of said plates axially to apply the brake and for balancing the applying force between said plates.

6. A rotatable brake element including an outer cup-shaped drum having a radial flange at its open side, a plate secured to said flange and partially closing the open side of the drum, and a friction element arranged within said drum and rotating with said drum.

7. A rotatable brake member, in combination with a rotatable friction member generally U-shaped in cross section, and means for keying said U-shaped section member to the rotatable member in a manner to permit it to shift its position axially.

8. A drum having spaced portions on its opposite sides, in combination with a friction element arranged within the drum, and a key device passing through aligned openings in said portions of the drum and in the friction member and permitting the friction member to shift its position in an axial direction within the drum.

9. A brake comprising a rotatable element, a disk member having spaced plates, a working disk member comprising a pair of disk plates arranged coaxially and mounted to be moved in opposite directions to force the pair of plates into frictional engagement with the plates of the disk member, one of said members being secured to said element so as to be rotated therewith and the other of said members being held against rotation, a plunger core secured to one of the plates of said working member, a solenoid for said plunger secured to the other plate of said working member, and means to energize said solenoid whereby to move said plates in opposite directions.

10. A disk brake comprising, in combination, a rotatable element, a pair of friction disks movable in opposite directions into engagement with said element, and electrical means for controlling the movement of said disks.

11. A disk brake comprising, in combination, a rotatable member generally U-shaped in cross-section and forming in effect a pair of connected spaced plates, and a pair of non-rotatable friction disks movable into engagement with the outer surfaces of said plates.

12. In an internal brake, the combination of a brake drum, an intermediate ring located within the said brake drum and connected thereto, additional non-turnable rings located within the said drum upon opposite sides of the said intermediate ring, the said rings being disposed about the same axis, and operating means adapted to cause the additional rings to frictionally bear against the intermediate ring, said operating means comprising a piston connected to one of said additional rings and a cylinder secured to the other of said additional rings for actuating the piston.

13. In an internal brake, the combination of a brake drum, an intermediate ring located within the said brake drum and connected thereto, additional non-turnable rings located within the said drum to bear in opposite directions on said intermediate ring, the said rings being disposed about the same axis, and operating means adapted to cause the additional rings to frictionally bear against the intermediate ring, said operating means comprising a cylinder connected to one of said additional rings, and a piston located within said cylinder and connected to the other of said additional rings.

14. In an internal brake, the combination of a brake drum, an intermediate ring located within the said brake drum and rotatable therewith, additional non-turnable rings located within the said drum to bear in opposite directions on said intermediate ring, the said rings being disposed about the same axis, and operating means adapted to cause the additional rings to frictionally bear against the intermediate ring, said operating means comprising a cylinder connected to one of said additional rings, and a piston located within said cylinder and connected to the other of said additional rings.

15. In an internal brake, the combination of a brake drum, an intermediate ring located within said brake drum and having its outer periphery connected to said drum to turn therewith, an inner non-turnable ring and an outer non-turnable ring located on opposite sides of the intermediate ring, the inner ring having a flange extending through the intermediate ring, a power actuating means secured to said flange and located beyond the outer ring and means connected to the outer ring and actuated by the said power actuating means.

16. In an internal brake for a wheel, the combination of an intermediate ring and two outer rings, all said rings having a common axis, the intermediate ring being connected to the wheel structure to turn therewith, means adapted to prevent the outer rings from turning with the wheel, and a power actuator cylinder structure connected to one of said outer rings to move relative thereto the other of said outer rings having an element coacting with said power actuator.

17. A disc brake comprising a fixed sleeve, a rotatable drum, a friction element therein and rotatable therewith, an annular member secured to said sleeve on one side of said friction element and an annular member slidably splined on said sleeve on the other side of said friction element and means secured on said sleeve adjacent said splined member comprising a power actuator having a plunger engaging said splined member.

18. In an internal brake, the combination of a brake drum, an intermediate ring located within the said brake drum and connected thereto, additional non-turnable rings located within the said drum upon opposite sides of the said intermediate ring, the said rings being disposed about the same axis, and operating means adapted to cause the additional rings to frictionally bear against the intermediate ring, said operating means comprising a cylinder connected to one of said additional rings, and a piston located within said cylinder and connected to the other of said additional rings.

19. In an internal brake, the combination of a brake drum, an intermediate ring located within said brake drum and having its outer periphery connected to the said drum to turn therewith, an inner non-turnable ring and an outer non-turnable ring located on opposite sides of the intermediate ring, the inner ring having a flange extending through the intermediate ring, a cylinder secured to said flange and located beyond the outer ring and a piston connected to the outer ring and located within the said cylinder.

20. In an internal brake for a wheel, the combination of an intermediate ring and two outer rings, all said rings having a common axis, the intermediate ring being connected to the wheel structure to turn therewith, means adapted to prevent the outer rings from turning with the wheel, a cylinder structure connected to one of said outer rings to move in unison therewith, the other of said outer rings having a piston-like extension fitting within said cylinder structure, and means adapted to force fluid under pressure into said cylinder structure to cause said outer rings to be simultaneously actuated towards the intermediate ring.

21. In an internal brake, the combination of a brake drum, an intermediate ring located within said brake drum and having its outer periphery connected to the said drum to turn therewith, an inner non-turnable ring and an outer non-turnable ring located on opposite sides of the intermediate ring, the inner ring having a member extending through the intermediate ring, a cylinder secured to said member and located beyond the outer ring and a piston connected to the outer ring and located within the said cylinder.

VINCENT BENDIX.